Sept. 15, 1959  N. F. KRUSE  2,904,435
PREPARATION OF FLAKED HULL PRODUCT
Filed July 6, 1956
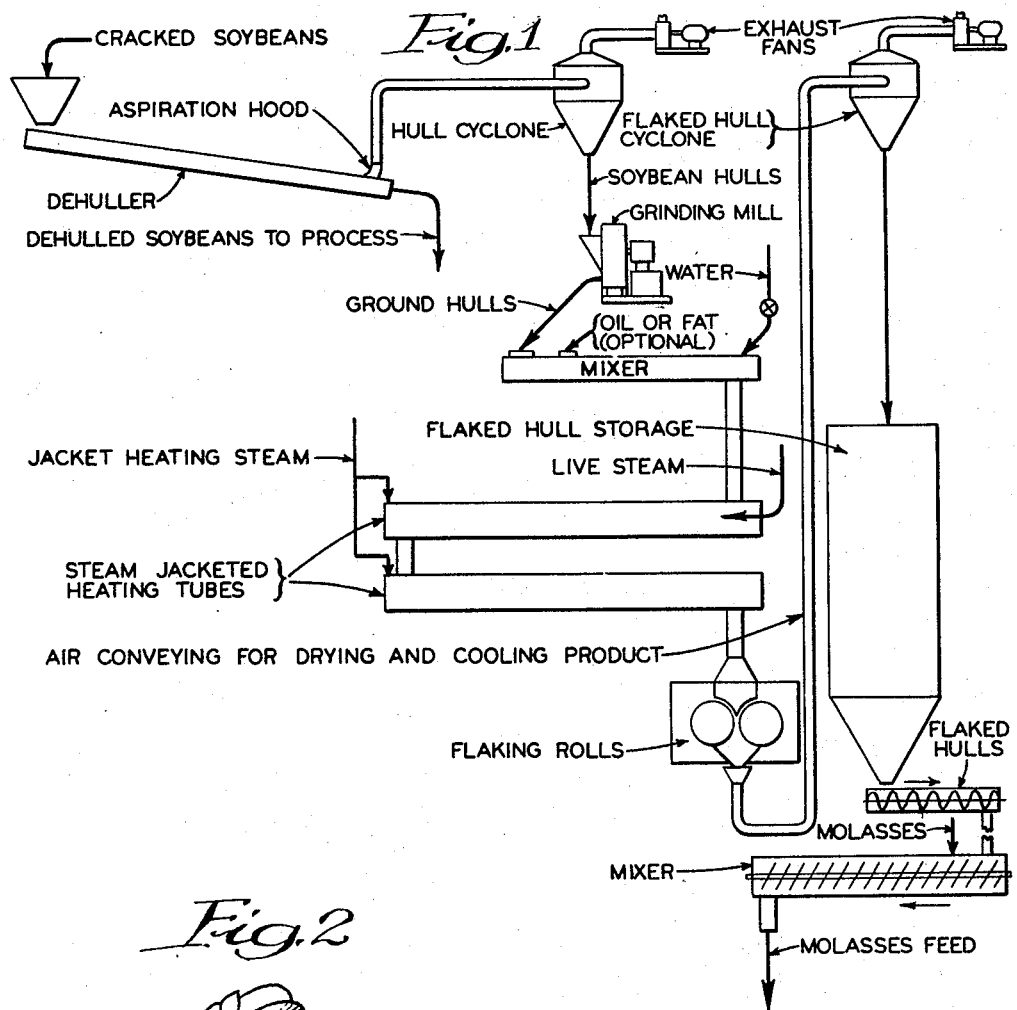
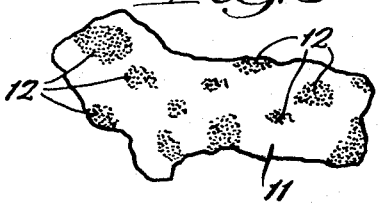
INVENTOR:
Norman F. Kruse,
BY Dawson, Tilton & Graham
ATTORNEYS.

United States Patent Office 2,904,435
Patented Sept. 15, 1959

2,904,435

PREPARATION OF FLAKED HULL PRODUCT

Norman F. Kruse, Decatur, Ind., assignor to Central Soya Company, Inc., Fort Wayne, Ind., a corporation of Indiana Application July 6, 1956, Serial No. 596,330

8 Claims. (Cl. 99—2)

This invention relates to a flaked hull product, and more particularly to a product of low bulk density having an excellent capacity for absorbing liquid ingredients.

Hulls, or other high fiber feed material such as soybean hulls, oat hulls, malt sprouts, brewer's yeast, grain screenings, weed seeds, pods, etc., are generally unsuitable for use in livestock feed because they will not blend well with other ingredients. Even when ground, the product is too dense and dusty for use in feed formulations. The soybean hulls are generally cup-shaped and have a protective wax coating which tends to make the cup shape of the hull persistent even after pressing and severe treatment, while at the same time preventing the material from being absorptive of liquid ingredients. The wax-coated hull remains a stiff and coarse material, making it unsuitable for feed formulations.

An object of the present invention is to provide a method and means for changing the character of hulls so that they lose their above-described coarse hull characteristics and become a material of low bulk density, having a high capacity for absorbing liquids. Another object is to provide a process whereby the hard shells or hulls lose their cellular structure and become translucent, thin flakes having no resemblance to the original hulls and having a bulky, spongy absorbent structure which is thin and silky to the touch. A still further object is to provide a process in which hulls are treated to make them hydrophilic by the modification of the wax coating to cause them to curl and roll into hull rolls which are then flaked so that they are no longer identifiable as hulls but constitute a new, physically different material capable of absorbing large amounts of liquids such as molasses, etc. A further advantage is that urease in soybean hulls and other toxic enzymes in other materials are also deactivated during the process. Other specific objects and advantages will appear as the specification proceeds.

In one embodiment of the invention, the process may be carried on in apparatus which is set out diagrammatically in the accompanying drawing, in which—

Figure 1 is a flow sheet showing the apparatus in which the process may be carried on; Fig. 2, a perspective view of a soybean hull after the treating operation and before flaking; and Fig. 3, a perspective view of a flaked product after the same has been mixed with molasses.

In one embodiment of the invention, in which soybeans are referred to as the source of the hulls which may be treated and as illustrated by Fig. 1 and the legends therein, cracked soybeans are passed through a de-huller and the hulls withdrawn through an aspiration hood into a hull cyclone receptacle. The hulls then are dropped into a coarse grinding mill in which the hulls are broken into fragments. Usually the hull fragments vary in shape from a half shell to one-tenth of a shell. The coarsely ground hulls are then passed into a mixer to which water is added to moisten the hulls. If desired, oil or fat may also be added at this point to further improve the plasticity of the flakes and to increase the energy value of the feed, but for the purpose of the present description, the operation will be described in which water alone is used.

The moistened hulls then pass into steam-jacketed conveying tubes in which the hulls are heated while simultaneously live steam is injected into the mass of hulls. The steam modifies the cellular structure and tends to dissolve the wax coating of the shells or hulls, while at the same time making the material plastic. The rapid heating also destroys the urease or other undesirable enzyme activity which may be present. Also, steam condenses upon the shells to thus meter the water applied thereto and to evenly coat the shells with moisture. As a result of the steam application, it is found that the shells or hulls tend to curl into a tubular or roll shape, as illustrated in Fig. 2, the hull roll being here identified by the numeral 10. Alternately, the hulls may be heated in a jacketed cooker without the addition of live steam. In this case, however, a longer holding time is required, and therefore it is usually not the preferred method.

The curled hulls are then passed between flaking rolls to form thin flakes, and the flakes are conveyed by air into a flaked hull cyclone and passed therefrom into a flaked hull storage bin. From the storage bin, the flaked hulls may be passed into a mixer to which molasses is added, and the final flaked product discharged therefrom. The product is a very thin flake which is indicated in Fig. 3 by the numeral 11. As a result of the highly absorptive character of the flake, the liquid from the molasses is drawn into the interior of the porous flake, leaving spaced solid molasses particles 12 on the exterior of the flake.

The flaked hull product before the addition of molasses is a very fluffy and bulky material which feels silky or slippery when passed between the fingers, the individual flakes being translucent and highly absorbent or spongy.

The persistent shell contour of the original hull is completely destroyed and this change seems to be accomplished largely by the removal of the wax or outer surface coating of the hull and the subsequent curling of the hull into the form illustrated in Fig. 2 prior to the flattening or flaking operation.

In the flaking operation, the two flaking rolls may be of the same size and may be run at the same speed. I prefer, however, to run one of the rolls slightly faster than the other to give a shearing action. This action on the steamed hulls tends to break the shells apart and leave open spongy structure for good liquid absorption.

After the flaking operation, I prefer to cool the material, allowing it to flash off the contained moisture and to drop within 20° of the atmospheric temperature, and then to mix the molasses or other liquid to be incorporated in the hulls at the lower temperature, in order to preserve freshness, desired aroma or odor of the added material.

The addition of moisture at the beginning of the operation is desirable in that the moisture, together with the rise in temperature, tends to destroy or inactivate the urease. Ordinarily, I find that the addition of enough water to bring the moisture content to 15% to 25% is highly satisfactory, best results being obtained when the moisture content after the addition of live steam reaches 18–20%.

The steam is preferably added in an amount sufficient to give a product temperature that is effective in inactivating the urease, removing the wax or surface coating of the hulls, and producing the curling described. Ordinarily, from 10 to 15% by weight of steam is found to be sufficient, since this tends to give a product temperature of 190 to 210° F., but lower or higher temperatures may be employed depending upon the type of hulls being treated and depending also upon the time in which the above-described treatment is being effected. The steam has a surprising effect upon the moistened hulls in that it not only makes the hull plastic in character, but also causes the hull to curl in the peculiar shape shown in Fig. 2 so that the hull, when subjected to the flaking operation, is in the nature of hull rolls or coils. When presented in this shape to the rolls, it is found that the hull loses its cup or shell shape and all identity with the original cup-shaped hull, the resulting flake being thin, wide and translucent. The coarse feel of the hull disappears and the flake has a silky or slippery feel and is compressible between the fingers. Instead of a dense rigid hull structure, the material is now fluffy, highly absorbent and translucent.

A water absorption test is often made to measure the liquid-holding capacity of feed ingredients. This test is made by adding water to a weighed portion of the ingredients until surplus water is apparent. After several minutes, the surplus water is drained off and the amount of water retained is determined. The following results show the remarkable absorptive characteristic of the new flaked soybean hull product as compared with other products:

| Sample | Bulk density (lbs./cu. ft.) | Percent water absorption |
| --- | --- | --- |
| Flaked soybean hulls | 8 | 525 |
| Ground hulls before flaking | 13 | 320 |
| Wheat bran | 11 | 240 |
| Beet pulp | 13 | 340 |
| Chopped alfalfa hay | 13 | 390 |

These tests show that the flaked soybean hulls should have excellent molasses absorption. This is the case, as this product can be used alone or combined with other ingredients to make an excellent dairy or beef feed containing from 25 to 35% molasses. The desirable qualities of having rations of high molasses content are well known to the trade.

If desired, the process may terminate at the point of discharge of the flaked hulls, as indicated by the broken conduit or line in Fig. 1, and the flaked hulls or high fiber feed materials may be discharged for packaging or storage or shipping, etc. I have found, however, as set out above, that the porous character of the product renders it exceptionally adapted for combining with molasses or other liquid nutrients. The thickness or thinness of the flake has a bearing upon the absorption of such liquid nutrients.

In the flaking of the product, flakes of from .005″–.006″ can be obtained. However, if a thicker product is desired, namely, to minimize breakage during handling, such as .01 to .015″, it still can be used in conventional dairy feeds, since such a product still has a molasses absorption capacity of approximately 30%. The amount of molasses may vary widely, as, for example, from 5 to 40% molasses. The molasses may be sprayed upon the material during mixing, and by reason of the highly absorbent character of the flakes, it is found that air drying is sufficient to bring about the final flake product illustrated in Fig. 3.

Referring to the optional process in which oil or fat is added along with the water, it is found that the oil does not affect the molasses absorption but is useful in plasticizing the product as well as furnishing an energy value (calorific value) to the final product. I prefer to add oil or fat in the proportion of 2 to 12%, but best results have been obtained where the percentage is about 2 to 4%.

It is surprising to find that the addition of the oil or fat, which aids in the plasticizing of the hulls, does not interfere with the absorptive character of the final flakes but instead a fluffy, highly absorbent finished product is obtained. I prefer to employ acidulated oils or fats because of their low cost and because of their nutritional adequacy for animal feeds. However, any suitable fat or oil may be used, as, for example, corn oil, cottonseed oil, vegetable oils and animal fats. Examples of the acidulated oils may be referred to as acidulated cottonseed oil, acidulated corn oil, mixed acid oils, etc.

The flaked hull product can be advantageously substituted for other fibrous ingredients such as alfalfa, wheat hulls, ground hulls, screenings, etc., in commercial dairy feed formulas. It was found that the feed made with the flaked hulls had a better appearance, the same or higher bulkiness, tended to cake less in storage, and when broken apart, expanded more than presently-used commercial dairy feeds. Such a flaked product could be used, if desired, as an excellent carrier for molasses, due to its superb water-absorption capacity.

Illustrative examples of the process may be set out as follows:

EXAMPLE I

Soybean hulls were moistened by the addition of 5% water and sufficient live steam was introduced to bring the hull temperature to approximately 200° F. and the moisture content to approximately 19%. In about five minutes, the operation was completed, the shells coiling upon themselves to form shell rolls, as shown in Fig. 2. The rolls were then passed through flaking rolls to form flakes of approximately .005″ thickness. The product was cooled by flashing off the moisture. The material thus obtained was silky, fluffy, soft, translucent, highly absorbent, and had lost all resemblance to the original material. The bulk density of this product was approximately 8 pounds per cubic foot; the water absorption under the water absorption test was found to be approximately 500%.

EXAMPLE II

The process was carried on as described in Example I except that the final product, consisting of absorbent flakes, was combined with approximately 30% molasses and the product air dried. The solid portions of the molasses appeared as particles upon the exterior surfaces of the flakes, as illustrated by Fig. 3, giving a dry product of low bulk density and possessing excellent handling characteristics.

EXAMPLE III

The process was carried on as described in Example I except that enough water and live steam was added to bring the moisture content of the hulls to 20% and the temperature to 210° F. The coiled or rolled shells were then passed through flaking rolls to give a thickness of approximately .010″ and a bulk density of 11 pounds per cubic foot. After cooling, approximately 30% molasses were added to produce a final product similar to that of Example II.

Similar processes were carried on in which molasses in the proportions of 5%, 10%, 20% and 40% were added, and with comparable results.

EXAMPLE IV

The flaked hull product as obtained in Example I or Examples II or III was substituted for beet pulp and alfalfa in a commercial dairy feed formula having the following constituents:

|  | New | Conventional |
| --- | --- | --- |
| Beet pulp | 9.5 | 20 |
| Bran | 23 | 24 |
| Limestone | 3 | 2 |
| Std. midds | 1 | 5 |
| Molasses | 30 | 28 |
| Def. phosphate | 1 | 1 |
| Salt | 1 | 1 |
| Processed soybean hulls | 30 |  |
| ¼″ chopped alfalfa |  | 19 |
| Urea | 1.5 |  |
|  | 100.0 | 100 |
| Yeast premix, lbs./ton | 1.0 | 1.0 |
| Trace minerals, lbs./ton | 0.4 | 0.4 |

It was found that the feed made with the flaked hulls had a bulk density which was approximately the same as that of the conventional formula; that the flaked hull feed had a better appearance and tended to cake less in the bag due to the highly absorbent character of the hulls.

EXAMPLE V

The process was carried on as described in Example I except that approximately 2% of acidulated corn oil was added. The product was a fine fluffy product, highly absorbent and comparable to the result described in Example I.

EXAMPLE VI

The process was carried on as described in Example V, except that acidulated cottonseed oil was used in an amount equal to 4%, and the final product was comparable to that described in Example V.

Similar tests were carried on using mixed vegetable oils and mixed acid oils, and with comparable results.

EXAMPLE VII

The process was carried on as described in Example I, except that in place of soybean hulls, oat hulls were treated as described in detail in Example I, and with comparable results.

EXAMPLE VIII

The process was carried on as described in Example I except that in place of soybean hulls, grain screenings were employed and along with the grain screenings were weed seeds, pods, etc. It was found that the process was effective in changing the character of such material to give the soft porous and absorbent material described in Example I.

EXAMPLE IX

Tests were carried out to obtain bulk densities and the water-absorbing power of hulls, along with the densities and water-absorbing characteristics of other feed ingredients before and after flaking. The results, as set out in the following tabulation, show that flaking increased the bulk densities and water-absorbing characteristics of the materials, and particularly those of the soybean hulls.

|  | Percent water absorbed | | Bulk density, approx. percent increase |
|---|---|---|---|
|  | Before flaking | After flaking |  |
| Soybean hulls | 300 | 500 | 60 |
| Beet pulp | 412 | 542 | 25 |
| Gluten feed | 336 | 374 | 5–10 |
| Chopped alfalfa (¼″) | 380 | 438 | 15 |

In all of the tests, it was found that after the application of water, live steam or dry heating caused the waxy coating of the hulls to disappear or to break up, and simultaneously therewith the individual hulls tended to coil into rolls. The application of pressure through the flaking rolls to the coiled material then produced a complete disintegration of the hull so that it was not identifiable thereafter and, instead, a new flake structure appeared bearing no resemblance to the coarse, shell-like structure of the original hull; instead, the flake was soft, compressible, highly absorbent, and translucent.

While, in the foregoing specification, I have set forth a specific process and product in considerable detail for the purpose of illustrating an embodiment of the invention, it will be understood that such details may be varied widely by those skilled in the art without departing from the spirit of my invention.

I claim:

1. In a process for preparing a flaked soybean hull product, the steps of moistening the hulls with water, heating the moistened hulls in the presence of live steam for a sufficient period of time to inactivate the urease therein and to cause the hulls to curl upon themselves, and then compressing the curled hulls to form flakes.

2. In a process for preparing a flaked soybean hull product, the steps of moistening the soybean hulls with water, heating the hulls in the presence of live steam to cause the hulls to curl upon themselves forming hull rolls, and then compressing the rolled hulls to form flakes.

3. The process of claim 2, in which the hulls are heated in a restricted zone to which heat is applied externally.

4. In a process for preparing a flaked soybean hull product, the steps of adding moisture to soybean hulls, introducing live steam into the moistened hulls to dissolve the waxy surface of the hulls and to cause the same to curl, and then compressing the curled hulls to form flakes.

5. The process of claim 4, in which the water content of the hulls is raised to approximately 15–20%.

6. The process of claim 4, in which the steam that is added is in an amount equal to 10–15% by weight.

7. The process of claim 4, in which the steam is added in an amount sufficient to raise the temperature to approximately 190–210° F.

8. In a process for preparing a soybean hull feed product, the steps of moistening the hulls with water, introducing into the moistened hulls live steam to cause the hulls to curl upon themselves, compressing the curled hulls to form spongy flakes, and adding 5–40% by weight of liquid molasses to the flakes.

References Cited in the file of this patent

UNITED STATES PATENTS

| 1,199,622 | Sheppard | Sept. 26, 1916 |
| 2,172,699 | Cohn | Sept. 12, 1939 |

FOREIGN PATENTS

| 524,963 | Great Britain | Aug. 19, 1948 |
| 140,049 | Australia | 1951 |